United States Patent [19]

Crockett et al.

[11] 3,818,357

[45] June 18, 1974

[54] INTEGRATOR PROVIDING AUTOMATIC TANGENTIAL BASE-LINE CORRECTION

[75] Inventors: Ivan L. Crockett, Cochranville, Pa.; Ian H. Davidson, London, England

[73] Assignee: Hewlett-Packard Company, Palo Alto, Calif.

[22] Filed: Oct. 16, 1972

[21] Appl. No.: 299,548

Related U.S. Application Data

[63] Continuation of Ser. No. 185,999, Oct. 4, 1971, abandoned.

[52] U.S. Cl. .................. 328/127, 307/229, 328/165

[51] Int. Cl. .......................................... H03k 17/00

[58] Field of Search ........... 328/127, 165, 168, 162; 235/183, 197; 307/229, 230

[56] References Cited

UNITED STATES PATENTS

| | | | |
|---|---|---|---|
| 3,434,062 | 3/1969 | Cox | 328/127 |
| 3,475,600 | 10/1969 | Spence | 328/165 |
| 3,541,320 | 11/1970 | Beall | 328/127 |
| 3,628,003 | 12/1971 | Spence | 328/165 |
| 3,660,769 | 5/1972 | Jordan | 328/127 |

*Primary Examiner*—Rudolph V. Rolinec
*Assistant Examiner*—B. P. Davis
*Attorney, Agent, or Firm*—Stephen P. Fox

[57] ABSTRACT

A system receives output signals from a gas chromatograph and integrates on a real time basis the area under peak curves superimposed on an exponentially decreasing solvent tail. Integration of a peak curve is performed in two parts. First, a constant level baseline correction signal is established at the starting point of the peak, the the curve is integrated with respect to the baseline correction signal during the time interval between the starting point and the crossover point of the peak curve and the baseline correction signal. Secondly, the peak curve is integrated with respect to both the baseline correction signal and a derived peak correction signal during the time interval between the crossover point and an end point of the curve. The sum of the two integrals indicates the area between the peak curve and a sloping baseline which extends from the starting point of the peak curve and is tangent to the exponentially decreasing solvent tail at an end point of the peak curve.

11 Claims, 10 Drawing Figures

PRIOR ART

INVENTORS
IVAN L. CROCKETT
IAN H. DAVIDSON
BY Stephen P. Fox
ATTORNEY

PATENTED JUN 18 1974 3,818,357

SHEET 2 OF 2

INVENTORS
IVAN L. CROCKETT
IAN H. DAVIDSON

BY Stephen P. Fox
ATTORNEY

INTEGRATOR PROVIDING AUTOMATIC TANGENTIAL BASE-LINE CORRECTION

This is a continuation of application Ser. No. 185,999, filed Oct. 4, 1971, now abandoned.

BACKGROUND OF THE INVENTION

The present invention relates generally to a system for receiving the output of an analytical test instrument and integrating the area under peak curves produced by the output signals when they are recorded as a function of time. Typically, the analytical instrument may be a gas chromatograph that is used to separate in time and individually detect the constituents of the sample to be analyzed. The gas chromatograph includes an analytical column through which a carrier gas is passed. A sample to be analyzed is typically dissolved in a solvent and injected into the carrier gas stream. A detector is provided at the end of the column to detect the separated sample constituents and the detector output signal is plotted as a function of time to produce a chromatogram. The detector output signal increases in response to the sample components eluted from the column, thereby to produce peak curves in the chromatogram. The area under each peak curve indicates the quantity of one of the components in the sample.

Often the peak signals produced by the analytical instrument are superimposed on a changing baseline. This is particularly true in the case where the analytical instrument is a gas chromatograph and the peak curves are superimposed on an exponentially decaying baseline signal commonly referred to as a solvent tail. Briefly, a solvent tail is produced when the quantity of solvent in which the sample is dissolved exceeds the separating capacity of the analytical column through which the sample and the solvent are passed. In this case, the solvent does not pass through the column as a discrete entity separated from the other sample components. Instead, the solvent passes through the column with a highly concentrated frontal area and a long following zone that contains solvent in gradually decreasing concentration. This zone interferes with the zones of the sample components which are detected as peaks at the output. The solvent zone is detected as an exponentially decreasing base signal, and the zones of the sample components within the decreasing solvent zone are detected as peaks on the decreasing base signal.

Several methods have been used to integrate the area under a peak curve on a solvent tail to determine the quantities of sample components. In particular, one method used has been to integrate the area under the peak curve with reference to a new constant level baseline set below the peak curve during a time interval starting at the beginning of the peak and ending at some predetermined time after the peak. Another method has been to integrate the area under the peak curve with respect to a new constant level baseline which is set to equal the signal at the beginning of the peak. The latter integral is taken from the peak starting time until the time that the crossover point of the peak curve and the new baseline is reached. Neither of these two methods provide an accurate indication of the area under the peak curve and thus do not accurately indicate the quantity of the sample component eluted from the gas chromatograph column.

Accordingly, it is a principle object of the invention to integrate the area under the peak curve which is superimposed on a decreasing base signal in a manner such that the integral value obtained in an accurate representation of the component being analyzed by the analytical instrument.

SUMMARY OF THE INVENTION

In the system of the present invention, the area under a peak curve superimposed on a changing base curve such as a solvent tail is integrated with respect to a sloping baseline that extends from the starting point of the peak curve and is tangent to the base curve at another point of the peak curve. Integration is performed as the peak curve is being generated, and the integral obtained accurately represents the area under the peak curve. Thus, in the case where the integrated curve is the output of a gas chromatograph, the integral accurately indicates the quantity of a sample component superimposed on a solvent tail.

In the illustrated embodiment of the invention, the output signal from the analytical instrument is differentiated and then applied to slope threshold detectors which indicate the starting and ending points of a peak curve. The instrument output signal at the time of the peak starting point is held by a sample and hold circuit and used as a constant level baseline correction signal. First, a digital integrator circuit integrates the peak curve signal with reference to the corrected baseline during the time interval from the starting point to the crossover point of the peak curve and the corrected baseline. Secondly, the peak curve signal and the baseline correction signal are combined with a derived peak correction signal and the total signal combination is integrated during the time interval from the crossover point to the point of the peak curve which is tangent to a line extending from the starting point. The derived peak correction signal is produced by differentiating and timing circuitry which provides a signal proportional to the product of the derivative of the instrument output signal and the elapsed time from the starting point of the peak curve. The sum of the first and second integrals obtained accurately represents the desired area under the peak curve.

DESCRIPTION OF THE PREFERRED EMBODIMENT

Figure 1A:
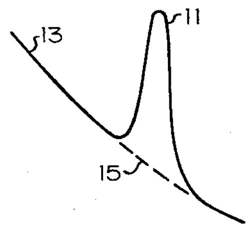
FIGS. 1*a–c* are waveform diagrams illustrating a signal peak superimposed on a charging baseline and prior art techniques for obtaining the area under the signal peak.
Figure 1B:
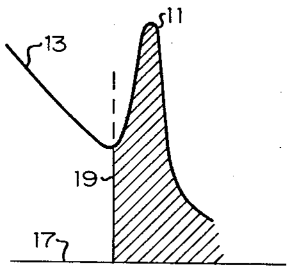
Figure 1C:
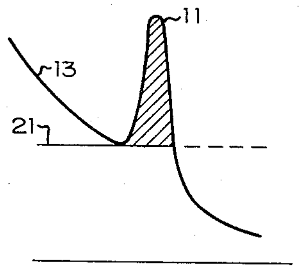

Referring to FIGS. 1*a–c*, there is shown a peak curve 11 typically recorded by a graphic recorder in response to the output of a detector at the end of a gas chromatograph column. As shown, the peak curve 11 is superimposed on a decreasing baseline 13, which is typically a solvent tail produced by the solvent in which the sample to be analyzed is dissolved. It is known that the area under the peak curve 11 represents the quantity of one component in the sample. Ideally, this area is bounded by the peak curve 11 and the projection of the decreasing baseline represented by the dashed line 15. Heretofore, several different methods have been used to approximate the area under the peak curve. FIG. 1b illustrates one method wherein integration of the peak curve signal is performed on a real time basis with respect to a fixed baseline 17 below the solvent tail. As shown, integration is performed from a drop line 19 at the beginning of the peak curve. The area obtained is illustrated by the shaded portion under the curve. FIG. 1c illustrates another integrating method, wherein integration of the peak signal is performed with respect to a new baseline 21 which is set at a fixed level equal to the signal level at the starting point of the peak. The shaded portion illustrates the integrated area. It can be seen that neither of the methods shown in FIGS. 1b and 1c produce an accurate representation of the area under the peak curve with respect to the projected decreasing baseline 15 shown in FIG. 1a. The accuracy in determining the quantity of the compound in a sample is correspondingly low.

Figure 2:
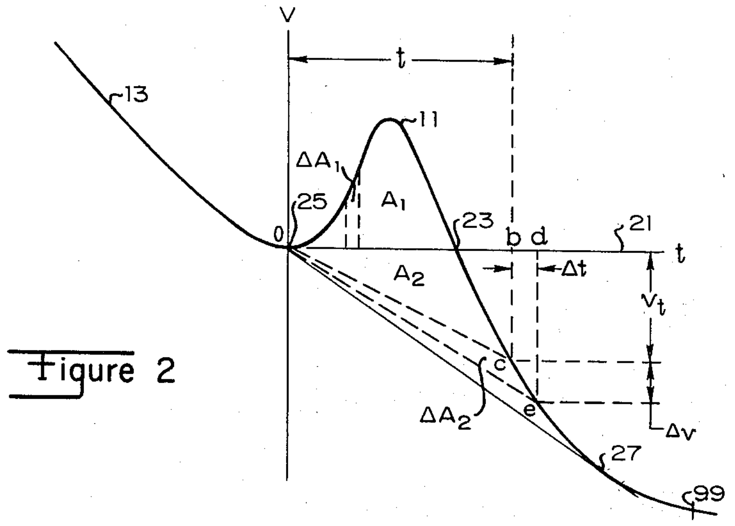
FIG. 2 is a waveform diagram illustrating in enlarged form the peak curve integrating technique employed by the system of the present invention.

FIG. 2 illustrates the technique employed by the present invention to obtain a very close approximation of the area under the peak curve with respect to the projection of the decreasing baseline, and thus to accurately indicate the quantity of a compound in a sample. Integration of the area under the peak curve is performed in two steps. Firstly, the area $A_1$ is found by integrating the peak signal 11 with respect to a baseline 21 which is set equal to the signal level at the starting point 25. Integration is performed from this starting point to the crossover point 23 of the peak curve signal and the baseline 21. Thereafter, integration is performed of a special signal derived from the peak signal to obtain the area $A_2$ bounded by the baseline 21, the peak curve and a line extending from the starting point 25 of the peak curve to a point 27 at which this line is tangent to the peak curve. The derived signal represents the area $\Delta A_2$, and integration during the time that the peak curve signal moves from point 23 to point 27 will provide the area $A_2$. The areas $A_1$ and $A_2$ are obtained sequentially by performing the integrations on a real time basis. It can be seen that the sum of the areas $A_1$ and $A_2$ is a very close approximation to the total area under the peak curve 11 with respect to the projected decreasing baseline 13.

A better understanding of the system for determining the area under the peak curve may be obtained by first considering the mathematical basis for real time integration of the peak signal and the special signals derived therefrom. It will be assumed that the peak curve is a graphic representation of the detector output voltage $v_t$ as a function of time. During the time that the peak signal moves from point 25 to point 23, the incremental area $\Delta A_1$ is represented by the expression $(v_t - v_o)\, \Delta t$ where $v_t$ is the peak signal voltage and $v_o$ is the voltage level at the baseline 21. The limit of this expression as $\Delta t$ approaches zero is given by the following equation:

$$dv/dt = v_t - v_o \quad (1)$$

As described more fully hereinafter, integration of this expression over the time period from point 25 to point 23 will yield the area $A_1$.

The incremental area $\Delta A_2$ is equal to the area of triangle deo minus the areas of triangle bco and quadralateral bced. This may be represented by the following equation:

$$\Delta A_2 = A_{deo} - A_{bco} - A_{bced} \quad (2)$$

The terms on the right-hand side of equation 2 are given by the following expressions:

$$A_{deo} = (t + \Delta t) \cdot (v_o - v_t - \Delta v)/2 \quad (3)$$

$$A_{bco} = t \cdot (v_o - v_t)/2 \quad (4)$$

$$A_{bced} = (v_o - v_t)\, \Delta t + \Delta v \Delta t/2 \quad (5)$$

When the terms in equations 3, 4, and 5 are substituted into equation 1 and the limit of the resulting expression is taken as $\Delta t$ approaches zero, the following equation is obtained:

$$dA_2/dt = 1/2\ [V_t - v_o - \mathrm{t}dv/dt] \quad (6)$$

The area $A_2$ is obtained by integrating the terms on the right-hand side of equation 6 during the time interval between points 23 and 27 in FIG. 2, i.e., between the cross-over point of the peak curve 11 and baseline 21 and the tangent point of the peak curve and the line extending from the starting point 25 of the peak curve.

Figure 3:
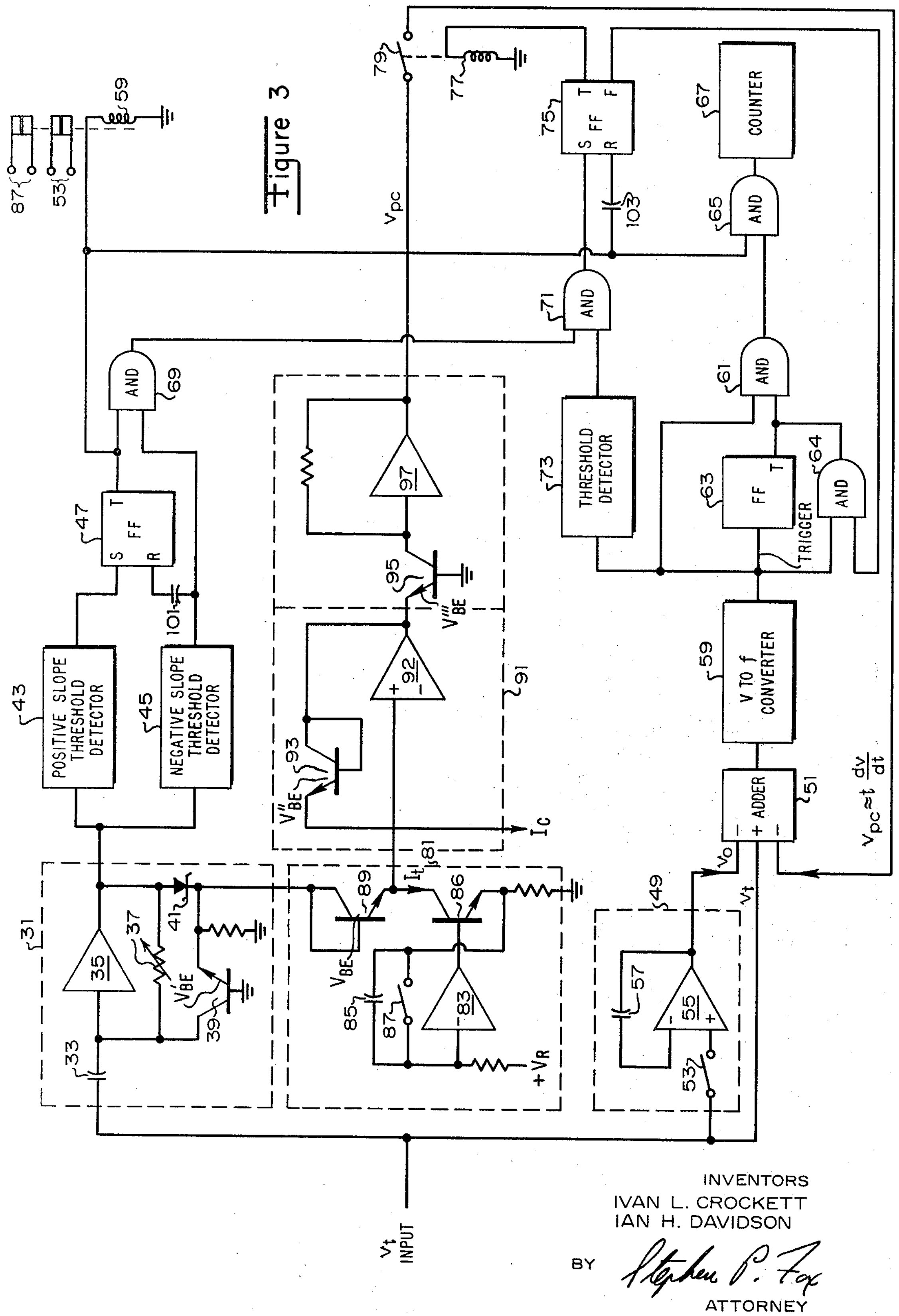
FIG. 3 is a combined schematic and block diagram illustrating the preferred embodiment of the system of the present invention.

FIG. 3 illustrates the system for obtaining and combining the two areas $A_1$ and $A_2$. The input of the system is the signal $v_t$ which is received from the detector output of a gas chromatograph, for example. This signal is applied to differentiator 31 including a differentiating capacitor 33 and an amplifier 35. Amplifier 35 is connected as an operational amplifier and has two feedback loops. The first loop includes an adjustable resistor 37 which provides linear feedback; whereas the second loop includes transistor 39 which provides logarithmic feedback as hereinafter described. The logarithmic feedback loop also includes a Zener diode 41 which renders this loop inoperative until the differentiated signal $v_t$ exceeds a predetermined negative value equal to the breakdown voltage of a Zener diode.

Figure 4:
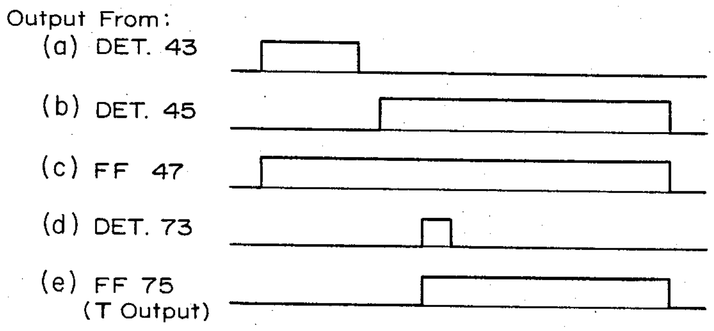
FIGS. 4*a–e* are timing diagrams illustrating the output signals at selected points in the system of FIG. 3 as a function of the corresponding times shown in FIG. 2.

While the detector signal $v_t$ is tracing the decreasing baseline portion of the curve indicated by reference numeral 13 in FIG. 2, the first feedback loop is active and the second feedback loop is inactive, and the differentiated signal is applied in parallel to threshold detectors 43, 45. When the derivative of the signal $v_t$ becomes positive, corresponding to point 25 in FIG. 2, the threshold detector 43 provides an output signal which sets a conventional R-S type of flip-flop 47, thereby to cause this flip-flop to produce a logical 1 signal on its true (T) output. FIGS. 4a and 4c illustrate the timing of the output pulses from detector 43 and flip-flop 47 with respect to the peak curve signal shown in FIG. 2. When the T output of flip-flop 47 goes high, a relay coil 59 is actuated and an AND gate 65 is enabled to apply pulses to a counter 67, thereby to initiate integration of the peak curve signal $v_t$ to determine the area $A_1$.

The input signal $v_t$ is also applied to a baseline reset circuit 49 and an adder 51. In the baseline reset circuit 49, the signal $v_t$ is applied through a normally closed pair of relay contacts 53 operated by relay 59 to a high gain differential amplifier 55 which has a capacitor 57 in a feedback loop. Amplifier 55 and capacitor 57 operate as a sample and hold circuit to provide a signal to adder 51 that is equal to the magnitude of the peak signal at the time that contacts 53 are opened by relay 59 when integration begins. The output signal $v_o$ from amplifier 55 is equal to the voltage level at the baseline 21 shown in FIG. 2. At this time, no signal is applied to the bottom input (as viewed in FIG. 3) of adder 51 for reasons hereinafter described, so that the output of adder 51 is a signal equal to the expression $(v_t - v_o)$. This signal is applied to a voltage-to-frequency converter 59 which emits a series of output pulses at a rate dependent on the magnitude of the input signal. These pulses are applied through an AND gate 61 to one input of an AND gate 65. A flip-flop 63 is effectively inactivated because its input and output are shunted through an AND gate 64, as hereinafter described. Thus both inputs of AND gate 61 receive the same pulses from converter 59. The other input of AND gate 65 is held in a logical 1 state by the T-output of flip-flop 47 as described above. Thus, the pulses from the voltage-to-frequency converter are transmitted through AND gate 65 to counter 67. The count accumulated by counter 67 represents the integral of the area under the peak curve 11 with respect to the reset baseline 21 as the peak signal $v_t$ traces the peak curve during the time interval from the starting point 25 to the crossover point 23 shown in FIG. 2.

While accumulation of the area $A_1$ is in progress, the slope of the peak curve becomes negative immediately after the maximum point of the curve is reached. The negative slope threshold detector 45 responds to a negative slope of a predetermined value to provide a logical 1 output signal, in shown n FIG. 4*b*. The value of the negative slope of the peak curve signal at which threshold detector 45 triggers is set by adjusting resistor 37. Threshold detector 45 is a conventional Schmitt trigger circuit that has a hysteresis characteristic which is adjusted to maintain a logical 1 output signal until the input signal drops to 50 percent of the turn-on threshold level. With this arrangement, threshold detector 45 turns-on before the peak signal $v_t$ reaches cross-over point 23 (FIG. 2) and turns-off after $v_t$ goes beyond tangent point 27.

The logical 1 signal from threshold detector 45 is applied to one input of an AND gate 69, the other input of which also receives a 1 signal from the true output of flip-flop 47. Thus, AND gate 69 provides a logical 1 signal to one input of an AND gate 71. The other input to AND gate 71 is coupled to the output of a threshold detector 73 which detects the crossover point 23. More specifically, threshold detector 73 averages the output pulses from the voltage-to-frequency converter 59 and provides a logical 1 signal when the average value drops below a predetermined low level which occurs when pulse generation ceases. The pulse output from detector 73 is shown in FIG. 4*d*. Since converter 59 produces pulses in response to the signal $v_t - v_o$, there will be no pulses produced when the peak signal $v_t$ is equal to the baseline $v_o$. This condition occurs at the crossover point 23 and is detected by threshold detector 73.

In response to the detection of crossover point 23, AND gate 71 sets a flip-flop 75 to begin integration of the area $A_2$. When flip-flop 75 is set, the true (T) output thereof produces a logical 1 signal as shown in FIG. 4e. This in turn energizes a relay coil 77 to close relay contacts 79. Also, at this time the false (F) output of flip-flop 75 produces a logical 0 which enables a complementing type of flip-flop 63 as hereinafter described. When relay contacts 79 close, a derived peak correction signal $v_{pc}$ is applied to adder 51 along with the signals $v_t$ and $v_o$. This operation in combination with the enablement of flip-flop 63 causes the generation of pulses which represent the area $A_2$ when they are accumulated by counter 67 during the time that the peak signal moves from point 23 to point 27 (FIG. 2).

The peak correction signal $v_{pc}$ is equal to the expression $Kt\,dv/dt$, where $K$ is a constant dependent on fixed circuit parameters, t is the elapsed time from the peak curve starting point 25 and $dv/dt$ is the real time slope of the curve. The peak correction signal is derived through the use of logarithmic multiplication in the following manner: first there is derived a signal proportional to elapsed time from the starting point 25. This is achieved by a logarithmic timer 81 including an amplifier 83 connected as an operational amplifier with a capacitor 85 and the base-emitter current path of the transistor 86 in a feedback loop. A pair of normally closed relay contacts 87 shunt the capacitor 85 and hold the timer inactive. The relay contacts 87 are associated with relay coil 59 and are opened in response to energization of coil 59 by flip-flop 47 at the integration starting point 25 (FIG. 2). When relay contacts 87 open, capacitor 85 begins charging from a fixed reference voltage $V_R$. The current $I_t$ through the collector of transistor 86 will be an increasing ramp function of the time from starting point 25. The collector of transistor 86 is coupled to the emitter of a transistor 89 which has its base and collector electrodes coupled together. The baseemitter voltage of transistor 89 is given by the following expression:

$$V_{BE} \approx kT/q \; 1n \; I_t/I_s$$

where $k$, $q$ and $I_s$ are internal parameters of transistor 89 and $T$ is the ambient temperature in degrees Kelvin. The collector electrode of transistor 89 receives a signal from the logarithmic feedback loop of differentiator 31. This signal is proportional to the base-emitter voltage of transistor 39 and is given by the following expression:

$$V'_{BE} \approx kT/q \; 1n \; I_{diff}/I'_s$$

where $K$, $q$ and $I'_s$ are internal parameters of transistor 39, $T$ is the ambient temperature, and $I_{diff}$ is a current proportional to $dv/dt$, i.e., the derivative of the input signal $v_t$. Transistor 39 is chosen to be of the same type as transistor 89, so that parameters $k$, $T$ and $q$ are the same for both transistors. As stated above, the logarithmic feedback loop is activated when the derivative output signal from amplifier 35 exceeds the breakdown voltage of Zener diode 41. The point at which this feedback loop is activated is selected to be at a time after the negative slope is detected by threshold detector 45 but before threshold detector 73 detects the crossover point 23 and initiates integration of the area $A_2$.

The signals proportional to $V_{BE}$ and $V'_{BE}$ are combined at the emitter of transistor 89 and applied to one input of a temperature compensating circuit 91. Circuit 91 includes a differential amplifier 92 and a transistor 93 in a feedback loop. The emitter of transistor 93 is referenced to a constant current source $I_C$. The base-emitter voltage of transistor 93 is given by the following expression:

$$V''_{BE} \approx kT/q \ \ln I_C/I''_S$$

where $k$, $q$ and $I''_S$ are internal transistor parameters and $T$ is ambient temperature as described above. Transistor 93 is chosen to be of the same type as transistors 39 and 89, so the parameters $k$, $T$ and $q$ are the same for all three transistors. The output of amplifier 92 is a level shifted signal which is applied to an exponentiating transistor 95. The two transistors 93, 95 act as temperature compensators by subtracting from the input signal a signal that is proportional to the temperature effects of the two transistors 39 and 89.

The base-emitter voltage of transistor 95 is $V'''_{BE}$ and is given by the following equation:

$$V'''_{BE} = V_{BE} + V'_{BE} - V''_{BE}$$

where the terms on the right-hand side of the equation are given above. The collector electrode of transistor 95 is coupled to an operational amplifier 97. The combination of transistor 95 and operational amplifier 97 produces the output signal $v_{pc}$ which is given by the following expression:

$$V_{pc} \approx I'''_s \ e \ qV'''_{BE}/kT \approx Kt \ dv/dt = t \ dv/dt$$

where $I'''_S$ is an internal parameter of transistor 95. The circuit parameters are selected so that $K = 1$. The output signal $v_{pc}$ is applied through relay contacts 79 to adder 51 beginning at the time when the peak curve signal reaches crossover point 23.

It can be seen from the foregoing description that the output signal $t \ dv/dt$ from amplifier 97 is obtained by first deriving signals proportional to the logarithms of the time, $t$, and the derivative of the peak curve signal, $dv/dt$, then summing these two signals, and finally exponentiating the sum of the signals. The resulting antilogarithm is a signal proportional to the product of the elapsed time, $t$, and the derivative, $dv/dt$. This type of multiplication is more fully described in an article entitled: "Multiplication and Logarithmic Conversion by Operational Amplifier-Transistor Circuits" by William L. Patterson, published in "The Review of Scientific Instruments," Vol. 34, No. 12, Dec. 1963, pages 1,311–1,316.

After relay contacts 79 close at the crossover point 23, the output signal from adder 51 is given by the expression ($v_t - v_o - t$ dv/dt). It will be noted that this expression is the same as that inside the brackets in equation 6 above, and that if one-half of this expression is integrated, the area $A_2$ will be obtained. As described above, integration is achieved by converting the output signal from adder 51 to pulses which are counted by counter 67. It will be recalled that when area $A_1$ is integrated, pulses from the voltage-to-frequency converter 59 are applied directly through AND gates 61 and 65 to the counter 67. At that time, flip-flop 75 produced a logical 1 signal at its false (F) output to enable AND gate 64 so that it shunted flip-flop 63 and rendered it inactive. However, at the crossover point 23, flip-flop 75 changes states, and the resulting logical 0 signal at the false (F) output thereof renders AND gate 64 inactive, thereby to enable the operation of flip-flop 63. Flip-flop 63 is a symmetrically triggered flip-flop, also called a complementing flip-flop, which changes from one state to the other in response to each input pulse. Thus, flip-flop 63 operates to enable AND gate 61 only on alternate pulses from converter 59, thereby to divide by two the number of output pulses applied from AND gate 61 to counter 67. Counting of these pulses between points 23 and 27 in FIG. 2 corresponds to integrating the area $A_2$.

When the tangent point 27 (FIG. 2) is reached, the output of adder 51 becomes zero, the voltage-to-frequency converter 59 ceases to emit pulses, and the integration operation terminates. At a point 99 farther along on the peak curve, the negative slope reaches a value which is about 50 percent of the value that triggered the negative slope threshold detector 45. As described above, when this 50 percent value is reached, the threshold detector 45 turns-off. As a result the output of detector 45 changes from a logical 1 to a logical 0 signal. This signal level transition has a polarity such that it is conducted by a capacitor 101 to the reset (R) input of flip-flop 47. The true (T) output of this flip-flop changes from a logical 1 to a logical 0 signal, thereby to de-energize relay coil 59. Also, the latter signal transition is conducted by a capacitor 103 to reset flip-flop 75. The resetting of flip-flops 47 and 75 condition the system circuitry to begin integration of new areas $A_1$ and $A_2$ in response to the next peak curve that may occur on the decreasing baseline signal. Before the next integration begins, counter 67 may be reset to zero by any suitable means, not shown.

In summary, the overall operation of the system is as follows: when a peak curve is first encountered, a new baseline signal $v_o$ is established by the sample and hold circuit 49 and the difference signal $v_t - v_o$ is obtained. This difference is the same as that given by equation 1 above, and it is integrated during a first mode of operation of the system corresponding to the time between the starting point 25 and the crossover point 23 to obtain the area $A_1$. At the crossover point, a second mode of operation of the system begins. In the second mode, the output of logarithmic multiplication circuitry is coupled to the adder 51 by relay contacts 79, so that the adder output is the signal $v_t - v_o - v_{pc}$. The output of adder 51 is then the same as the expression inside the brackets of equation 6. One-half of this expression is integrated during the time from the crossover point 23 to the tangent point 27 to obtain $A_2$. At the end of both integration processes, the counter 67 contains the counts corresponding to the sum of $A_1$ and $A_2$. This sum represents the total area under the peak curve with respect to the tangent line, which in turn represents the quantity of the corresponding component in the sample analyzed by a gas chromatograph, for example.

We claim:

1. An apparatus responsive to the output signal of an instrument for integrating the area under a curve produced by a peak signal superimposed on a decreasing base signal, said apparatus comprising:

means for sensing the starting point of said peak signal;

first means coupled to receive said instrument output signal and operable in response to said sensing means for producing a constant level baseline correction signal equal to the level of said instrument output signal at said starting point;

means for differentiating said instrument output signal;

second means coupled to the output of said differentiating means and operable in response to said sensing means for providing a peak correction signal proportional to the product of the elapsed time from said starting point and the derivative of said instrument output signal;

means for detecting the crossover point of said instrument output signal and said baseline correction signal;

integrating means responsive to said sensing means and said detecting means and operable in first and second modes for providing an output signal equal to the integral of predetermined combinations of said instrument output signal, said baseline correction signal and said peak correction signal;

said first mode being operable to integrate the difference between said instrument output signal and said baseline correction signal during the time interval between said starting point and said crossover point; and said second mode being operable to integrate one-half the difference between said instrument output signal and the sum of said baseline correction signal and said peak correction signal during the time interval between said crossover point and the tangent point of the curve produced by said peak signal and a line extending from said starting point.

2. The apparatus of claim 1, wherein said integrating means includes:

a digital integrating circuit having an analog signal input and a control input, said control input being coupled to said sensing means for initiating integration in response to the sensing of said starting point; and combining means for receiving signals at first, second and third input terminals and providing an output signal to the analog signal input of said digital integrating circuit, said last named output signal being equal to the signal at said first input terminal minus the signals at said second and third input terminals, said first and second input terminals being coupled to receive said instrument output signal and said baseline correction signal, respectively; and switch means for coupling said peak correction signal from said second means to the third input of said combining means in response to the detection of said crossover point by said detecting means.

3. The apparatus of claim 2, wherein said first means for producing a baseline correction signal includes circuit means for sampling said instrument output signal and holding said instrument output signal in response to the sensing of said starting point by said sensing means, said circuit means having an output coupled to the second input terminal of said combining means.

4. The apparatus of claim 2, wherein said digital integrating circuit includes:

voltage-to-frequency converter means having an input coupled to the output of said combining means for providing output pulses at a rate proportional to the magnitude of the analog signal applied to said converter means; and means coupled to the output of said voltage-to-frequency converter means for accumulating said output pulses.

5. The apparatus of claim 4, wherein said voltage-to-frequency converter means provides output pulses only in response to one polarity of said analog signal, thereby to cease integration when said tangent point is reached.

6. The apparatus of claim 4, further including means coupled between said voltage-to-frequency converter means and said accumulating means for dividing in half the number of said output pulses, said dividing means having a control input coupled to the output of said detecting means and being operable in response to the detection of said crossover point.

7. The apparatus of claim 4, wherein said means for detecting said crossover point includes a threshold detector coupled to the output of said voltage-to-frequency converter for indicating when said output pulses cease, thereby to indicate that said crossover point has been reached.

8. The apparatus of claim 1, wherein said sensing means includes slope detecting means coupled to the output of said differentiating means for providing first and second output signals in response to the output signal from said differentiating means reaching predetermined positive and negative values, respectively, said positive value corresponding to said starting point of said peak signal, and said negative value corresponding to an ending point of said peak signal.

9. The apparatus of claim 1, wherein said second means for providing a peak correction signal includes:

timer means for providing an output signal proportional to the elapsed time interval from said starting point; and means for forming the product of the output signal from said differentiating means and said timer means to provide a signal to said integrating means.

10. The apparatus of claim 8, wherein:

said differentiating means includes logarithmic amplifier means providing an output signal proportional to the logarithm of the derivative of said instrument output signal;

said timer means includes logarithmic amplifier means for providing an output signal proportional to the logarithm of the elapsed time interval from said starting point; and said means for forming the product of said output signals includes: means for summing the outputs of the logarithmic amplifier means of said differentiating means and said timer means; and exponentiating amplifier means for taking the antilogarithm of the output of said summing means.

11. A method for operating on the output signal of an instrument to integrate the area under a curve produced by a peak signal superimposed on a decreasing base signal the method comprising the steps of:

1. producing a constant level baseline correction signal equal to the level of said instrument output signal at a starting point of the curve produced by said peak signal;

2. producing a peak correction signal proportional to the product of the elapsed time from said starting point and the derivitive of the instrument output signal;
3. integrating the difference between said instrument output signal and said baseline correction signal during the time interval between said starting point and the crossover point of said instrument output signal and said baseline correction signal;
4. integrating one-half the difference between said instrument output signal and the sum of said baseline correction signal and said peak correction signal during the time interval between said crossover point and the tangent point of the curve produced by said peak signal and a line extending from said starting point; and
5. adding the results obtained from steps (3) and (4).

* * * * *